US010967335B2

(12) United States Patent
Durfee

(10) Patent No.: US 10,967,335 B2
(45) Date of Patent: Apr. 6, 2021

(54) WATER CONTAINER WITH AN OZONE DIFFUSER

(71) Applicant: Eileen Durfee, Kennewick, WA (US)

(72) Inventor: Eileen Durfee, Kennewick, WA (US)

(73) Assignee: CREATRIX SOLUTIONS LLC, Kennewick, WA (US)

(\*) Notice: Subject to any disclaimer, the term of this patent is extended or adjusted under 35 U.S.C. 154(b) by 393 days.

(21) Appl. No.: 16/301,394

(22) PCT Filed: Aug. 26, 2016

(86) PCT No.: PCT/IB2016/055124
§ 371 (c)(1),
(2) Date: Nov. 13, 2018

(87) PCT Pub. No.: WO2017/195006
PCT Pub. Date: Nov. 16, 2017

(65) Prior Publication Data
US 2020/0316535 A1     Oct. 8, 2020

Related U.S. Application Data

(60) Provisional application No. 62/336,010, filed on May 13, 2016.

(51) Int. Cl.
*B01F 3/04* (2006.01)
*B01D 19/00* (2006.01)
(Continued)

(52) U.S. Cl.
CPC ...... *B01F 3/04262* (2013.01); *B01D 19/0005* (2013.01); *B01F 3/04808* (2013.01);
(Continued)

(58) Field of Classification Search
CPC ............ B01D 19/0005; B01F 3/04262; B01F 3/04808; B01F 5/0415; B01F 2003/04319; B01F 2215/0052; C02F 1/20; C02F 1/78
See application file for complete search history.

(56) References Cited

U.S. PATENT DOCUMENTS 3,692,180 A \* 9/1972 LaRaus ................ C02F 1/78
                                                  210/139
4,019,986 A \* 4/1977 Burris .................. C02F 1/78
                                                  210/139
(Continued)

FOREIGN PATENT DOCUMENTS

WO     WO 90/05011 A1 \*    5/1990

*Primary Examiner* — Charles S Bushey

(57) ABSTRACT

A water container with an ozone diffuser is an apparatus that is used to diffuse ozone gas into water that is either flowing through the apparatus or is retained by the apparatus. The apparatus includes an aeration chamber, an ozone generator coupler, a distribution hub, a plurality of porous tubes, and a degassing unit. The ozone generator coupler allows the apparatus to connect with a pressurized supply of ozone gas. The aeration chamber is used to retain the water that is currently being aerated by the ozone gas. The distribution hub receives the ozone gas from the ozone generator coupler and distributes the ozone gas amongst the porous tubes. The ozone gas is then evenly inserted from the porous tubes into the water retained by the aeration chamber. The degassing unit is used to neutralize the excess ozone before exhausting the excess ozone into the apparatus's surroundings.

14 Claims, 6 Drawing Sheets

(51) Int. Cl.
*B01F 5/04* (2006.01)
*C02F 1/20* (2006.01)
*C02F 1/78* (2006.01)

(52) U.S. Cl.
CPC .............. *B01F 5/0415* (2013.01); *C02F 1/20* (2013.01); *C02F 1/78* (2013.01); *B01F 2003/04319* (2013.01); *B01F 2215/0052* (2013.01)

(56) References Cited

U.S. PATENT DOCUMENTS

| | | | | |
|---|---|---|---|---|
| 4,072,613 | A * | 2/1978 | Alig | C02F 1/78 210/198.1 |
| 5,190,648 | A * | 3/1993 | Ramsauer | B01D 35/157 210/695 |
| 5,900,143 | A * | 5/1999 | Dalton | C02F 9/005 210/192 |
| 6,623,635 | B2 * | 9/2003 | Barnes | C02F 1/006 210/188 |
| 7,022,225 | B1 * | 4/2006 | Clawson | B01D 19/0063 210/188 |
| 7,931,816 | B2 * | 4/2011 | Conger | B01J 8/0278 210/759 |
| 8,192,619 | B2 * | 6/2012 | Patera | C02F 1/4672 210/192 |
| 8,440,080 | B2 * | 5/2013 | Salama | C25B 9/00 210/243 |
| 8,871,085 | B2 * | 10/2014 | Davis | F25D 11/00 210/86 |

* cited by examiner

WATER CONTAINER WITH AN OZONE DIFFUSER

The current application is a 371 of international Patent Cooperation Treaty (PCT) application PCT/IB2016/055124 filed on Aug. 26, 2016. The PCT application PCT/IB2016/055124 claims priority to U.S. provisional application Ser. No. 62/336,010 filed on May 13, 2016.

FIELD OF THE INVENTION

The present invention relates generally to a container that is able to diffuse ozone into the water retained by the container. More specifically, the present invention extracts ozone from an external pressurized source, inserts the ozone into the water retained by the present invention, and finally neutralizes any excess ozone gas while releasing non-flammable concentrations of oxygen into the surrounding environment.

BACKGROUND OF THE INVENTION

Ozonated water has proven to improve the physical well-being of an individual. Drinking ozonated water not only kills bacteria, cleanses the blood stream, and increases energy levels, but is being used outside of the USA as a supplemental treatment for cancer in many countries. Despite having numerous physical benefits, devices for generating ozonated water in a safe manner are not readily available. Current devices that are able to make ozonated water are not designed to be portable. However, the most damaging consequence of these current devices is that their insufficient construction allows ozone gas to escape into the surrounding environment. If a person inhales ozone gas at a certain concentration level, the results may be dangerous or even fatal for the person.

Therefore, the objective of the present invention to provide an apparatus that can function as an ozone diffuser and a degasser assembly. The present invention is designed to dissolve large amounts of ozone gas into water and then neutralize the portion of ozone gas that escapes into the air. Preferably, the preset invention is a countertop container that holds a desired quantity of water. A user is able to ozonate the water by connecting an external ozone generator to the present invention. The present invention then acts as a diffuser that dissolves a stream of ozone gas that is supplied by the external ozone generator. Alternatively, the present invention is able to provide a continuous supply of ozonated water when connected to an external water supply and the external ozone generator.

DETAILED DESCRIPTION OF THE INVENTION

All illustrations of the drawings are for the purpose of describing selected versions of the present invention and are not intended to limit the scope of the present invention.

Figure 1:
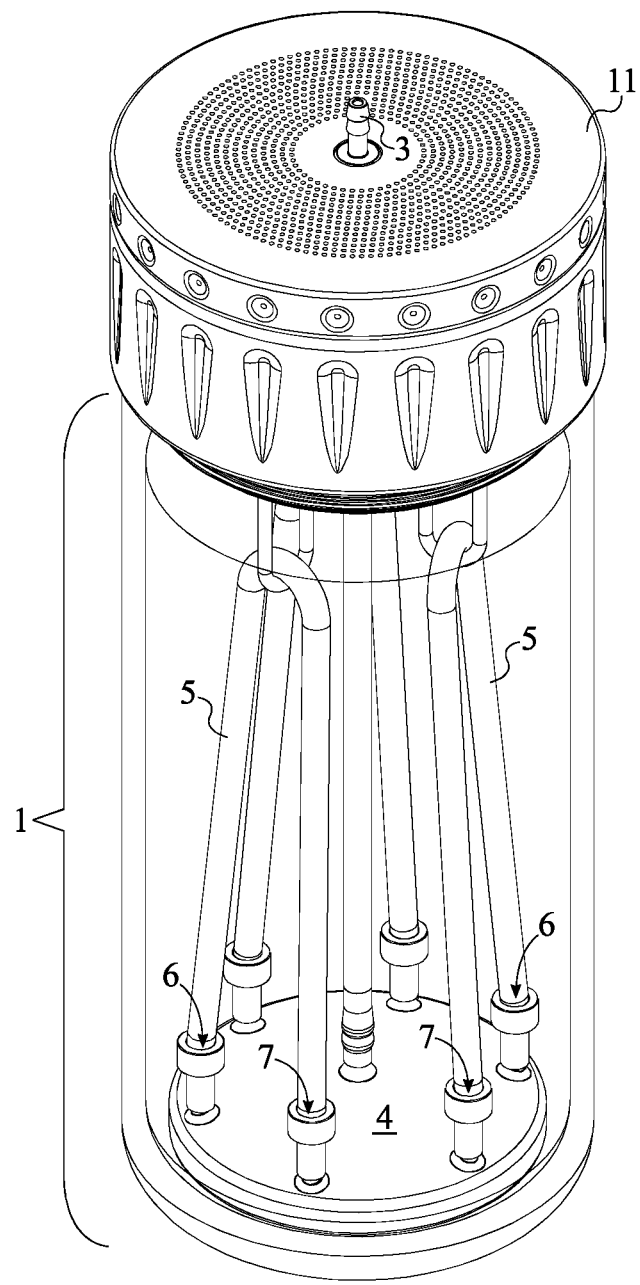
FIG. 1 is a top perspective view of the present invention.
Figure 2:
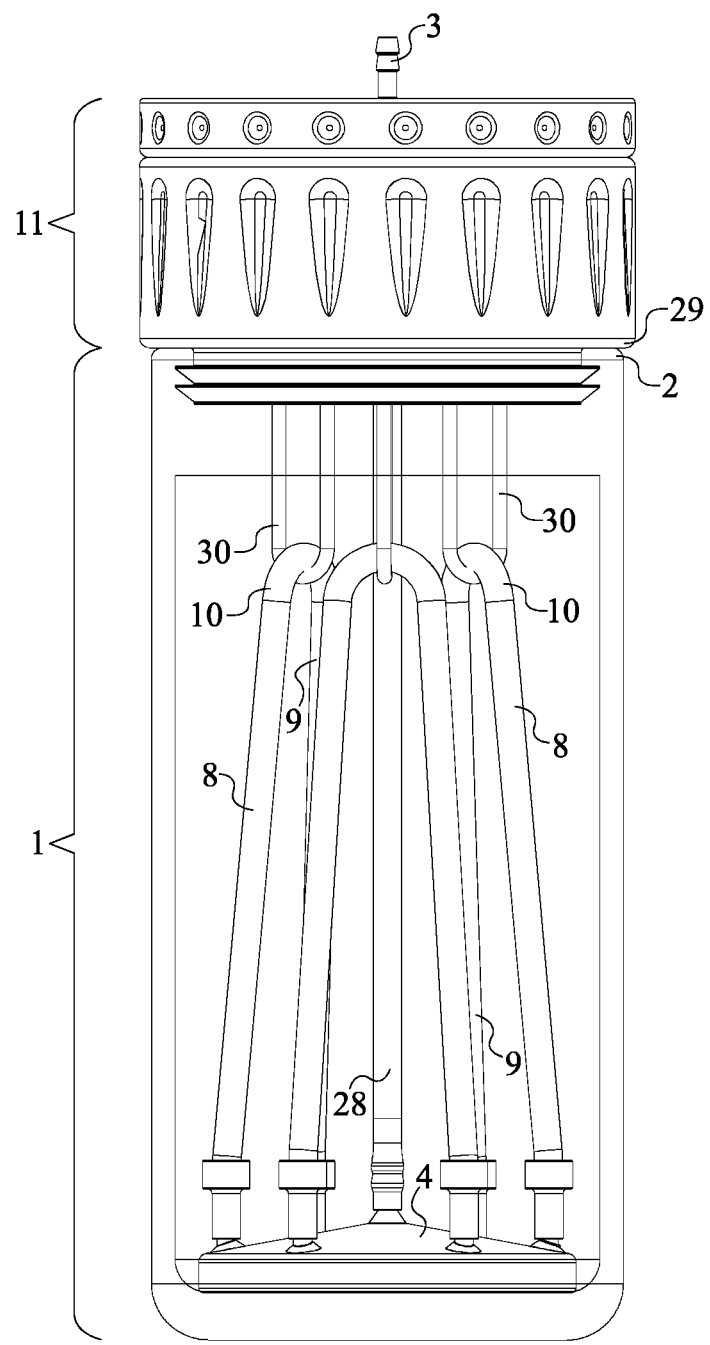
FIG. 2 is a side view of the present invention.

As can be seen in FIG. 1 and FIG. 2, the present invention is a water container with an ozone diffuser that is used to produce ozonated water. Preferably, water is retained by the present invention. Ozone gas is then fed into the present invention from a pressurized source in order to aerate the ozone into the water. Any undissolved ozone gas is removed, and non-volatile oxygen gas is released into the surrounding environment. The present invention comprises an aeration chamber 1, an ozone generator coupler 3, a distribution hub 4, a plurality of porous tubes 5, and a degassing unit 11. The aeration chamber 1 is used to retain the water that is to be aerated by the ozone. The ozone generator coupler 3 is used to deliver the ozone from a pressurized source into the present invention. The distribution hub 4 allows the present invention to evenly divide the ozone amongst the plurality of porous tubes 5. That is, the distribution hub 4 is designed to split the stream of ozone gas into several streams that are supplied to the plurality of porous tubes 5, and can be devices including, but not limited to manifolds, valve assemblies, and fluid control systems. The plurality of porous tubes 5 is used to aerate the ozone into the water retained by the aeration chamber 1. The degassing unit 11 is used to safely neutralize undissolved ozone gas before exhausting benign gases into the external environment.

The general configuration of the aforementioned components allows the present invention to effectively and efficiently aerate ozone into water. The ozone generator coupler 3 is positioned external to the aeration chamber 1 so that the present invention is able to draw ozone from a pressurized source located outside of the present invention. The ozone generator coupler 3 is in fluid communication with the distribution hub 4, which is mounted within the aeration chamber 1. In addition, the distribution hub 4 is in fluid communication with the plurality of porous tubes 5. This configuration between the ozone generator coupler 3, the distribution hub 4, and the plurality of porous tubes 5 allows the ozone to flow from the pressurized source into the present invention and allows the ozone to be aerated into the water retained by the aeration chamber 1. Preferably, the plurality of porous tubes 5 causes the pressurized ozone gas to form a plurality of small bubbles within the water stored in the aeration chamber 1. The plurality of small bubbles has an increased surface area that facilitates creating a homogeneous ozone-water mixture. In addition, the plurality of porous tubes 5 needs to be distributed within the aeration chamber 1 so that the ozone that is forced out of the pores of the plurality of porous tubes 5 is evenly spread throughout the water retained by the aeration chamber 1. Moreover, the degassing unit 11 is in fluid communication with the aeration chamber 1 and is positioned external to the aeration chamber 1 so that the excess ozone can be collected by the degassing unit 11 and prevented from being exhausted out of the present invention.

Figure 5:
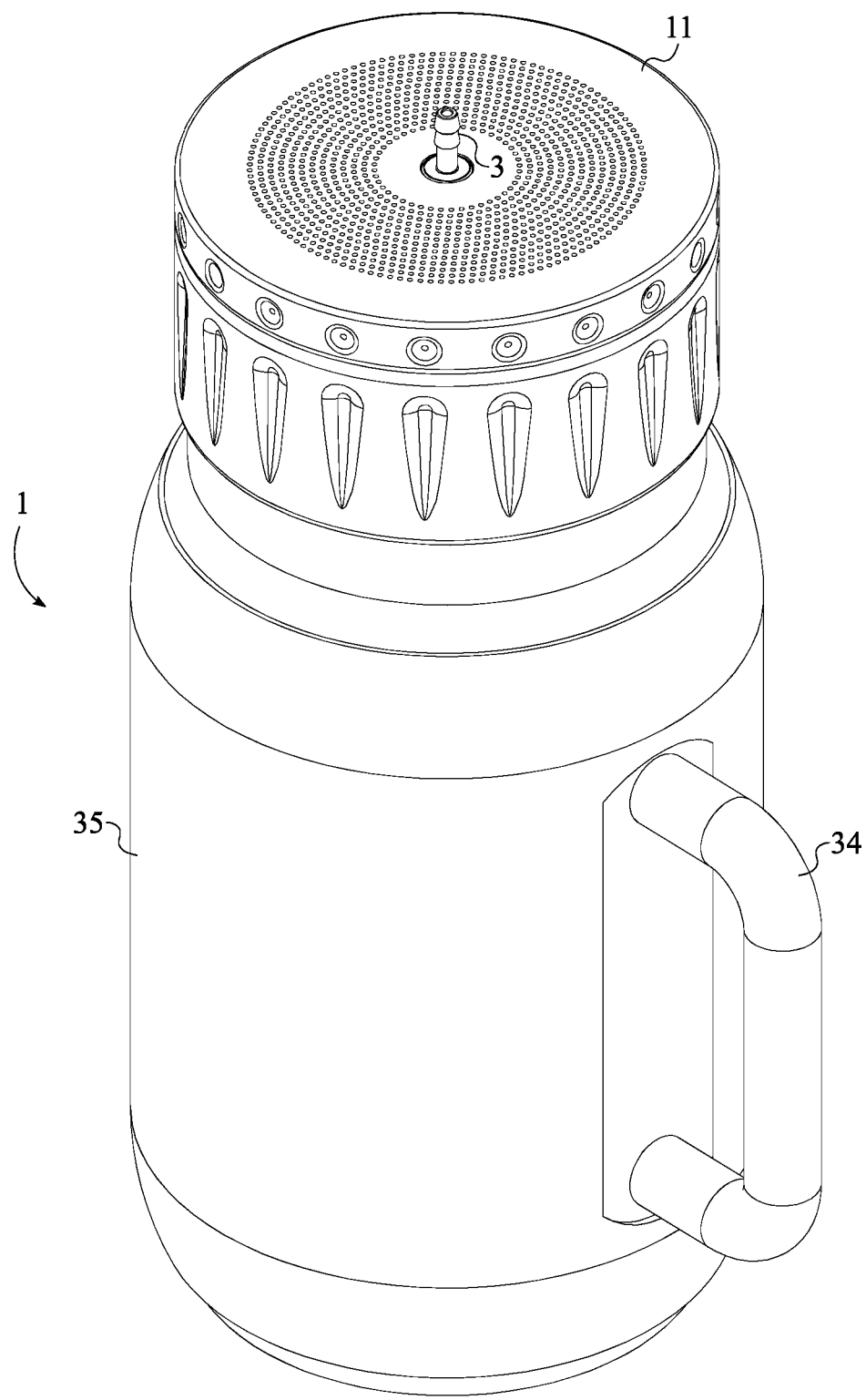
FIG. 5 is a top perspective view of an alternative embodiment of the present invention.
Figure 6:
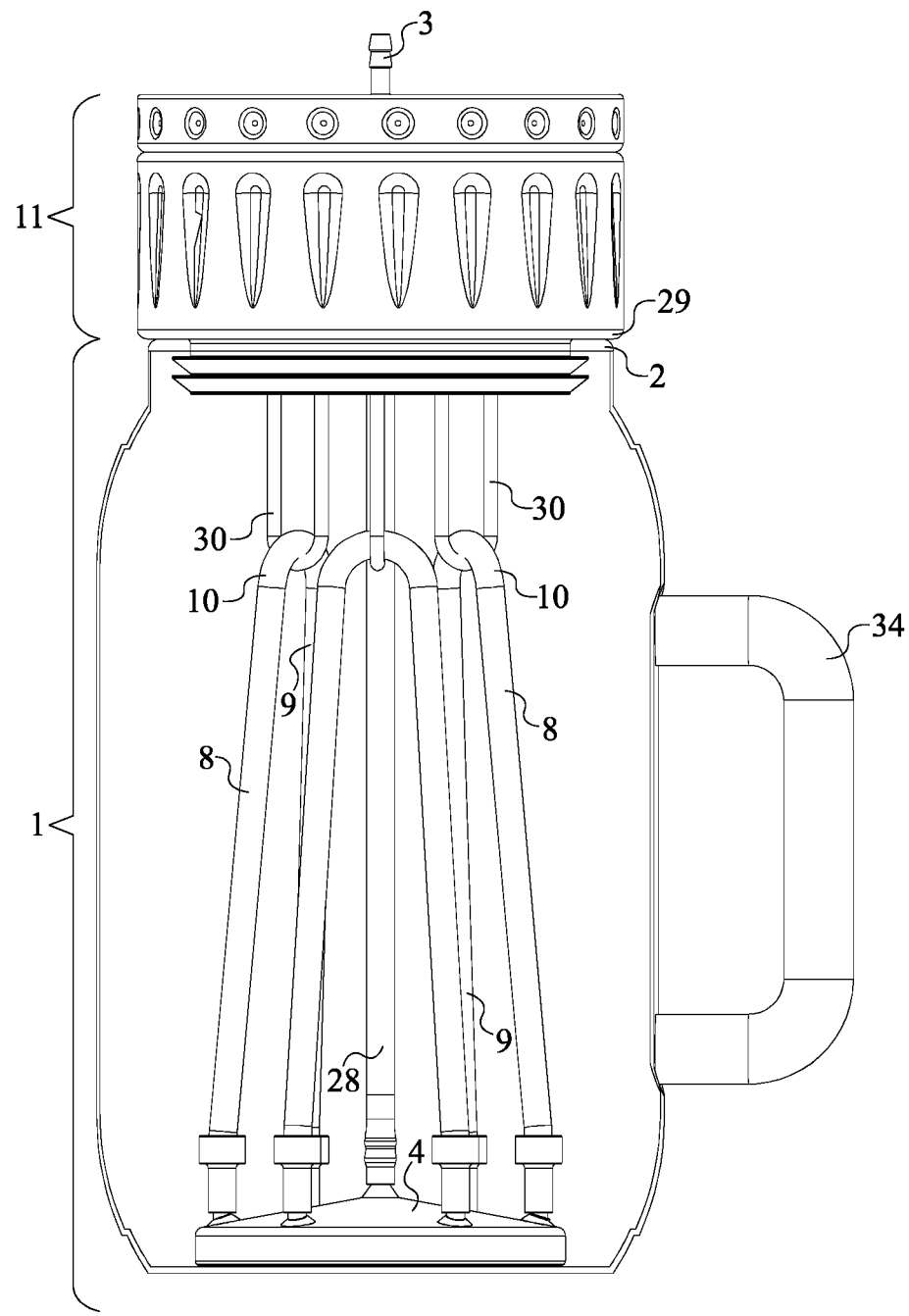
FIG. 6 is a side view of an alternative embodiment of the present invention with the protective cover removed.

As can be seen in FIG. 1, FIG. 2, and FIG. 5 the preferred embodiment of the present invention is configured to mix the stream of ozone gas from the external ozone generator with a quantity of water retained within the aeration chamber 1. The present invention further comprises an input tube 28 and a cap 29. Additionally, the aeration chamber 1 is a receptacle with an opening, and the cap 29 is used to cover and uncover the opening of the receptacle. The opening is delineated by a rim 2 of the receptacle so that the cap 29 is removably engaged to the rim 2. Alternative connection systems can be used to mount the cap 29 over the rim 2 and seal the aeration chamber 1. For example, the cap 29 can be mounted over the rim 2 using detachable fastening systems that include, but are not limited to, threaded connectors, interlocking members, and press-fit couplers. These detachable fastening systems enable the cap 29 to seal the aeration chamber 1 until disengaged by the user. The input tube 28 is a conduit for ozone to travel into the water retained by the receptacle, and, thus, the input tube 28 traverses through the cap 29 and into the receptacle. Moreover, the ozone generator coupler 3 is in fluid communication with the distribution hub 4 through the input tube 28, which allows the input tube 28 to be a pathway for a continuous supply of ozone from the ozone generator coupler 3 to the distribution hub 4. Resultantly, the present invention inserts ozone into the water retained by forcing ozone gas into the refillable receptacle. Preferably, the present invention is used as portable dispenser for ozonated water.

The plurality of porous tubes 5 is configured to maximize the diffusion of ozone into the water retained by the refillable receptacle. Thus, the plurality of porous tubes 5 needs to be distributed about the distribution hub 4 and needs to be distributed throughout the aeration chamber 1, which is illustrated in FIG. 1 and FIG. 2. In addition, each of the plurality of porous tubes 5 comprises a tube inlet 6 and a tube outlet 7, which are the opposing open ends for each of the plurality of porous tubes 5. The tube inlet 6 and the tube outlet 7 from each of the plurality of porous tubes 5 is in fluid communication with the distribution hub 4, which allows ozone to evenly enter through both ends of each porous tube 5 and to be evenly forced out of the pores of each porous tube 5. The plurality of porous tubes 5 is preferably made of polytetrafluoroethylene (PTFE).

The plurality of porous tubes 5 is fixed to the cap 29 by a plurality of hangers 30, which are shown in FIG. 2. The plurality of porous tubes 5 needs to comprise a first straight portion 8, an adjoining portion 10, and a second straight portion 9. The tube inlet 6 leads into the first straight portion 8, while the tube outlet 7 leads into the second straight portion 9. Moreover, the first straight portion 8 and the second straight portion 9 are in fluid communication with each other through the adjoining portion 10 in order to form a U-shaped profile with each of the plurality of porous tubes 5. The U-shaped profile of each of the plurality of porous tubes 5 positions the adjoining portion 10 adjacent to the rim 2 of the receptacle. Thus, the plurality of hangers 30 is connected adjacent to the cap 29 within the receptacle so that the adjoining portion 10 for each porous tube 5 can be hung from a corresponding hanger from the plurality of hangers 30. The arrangement between the cap 29, the plurality of hangers 30, the plurality of porous tubes 5, and the distribution hub 4 allows for the distribution hub 4 and the input tube 28 to be removed from the receptacle when the cap 29 is disengaged and removed from the receptacle.

Figure 3:
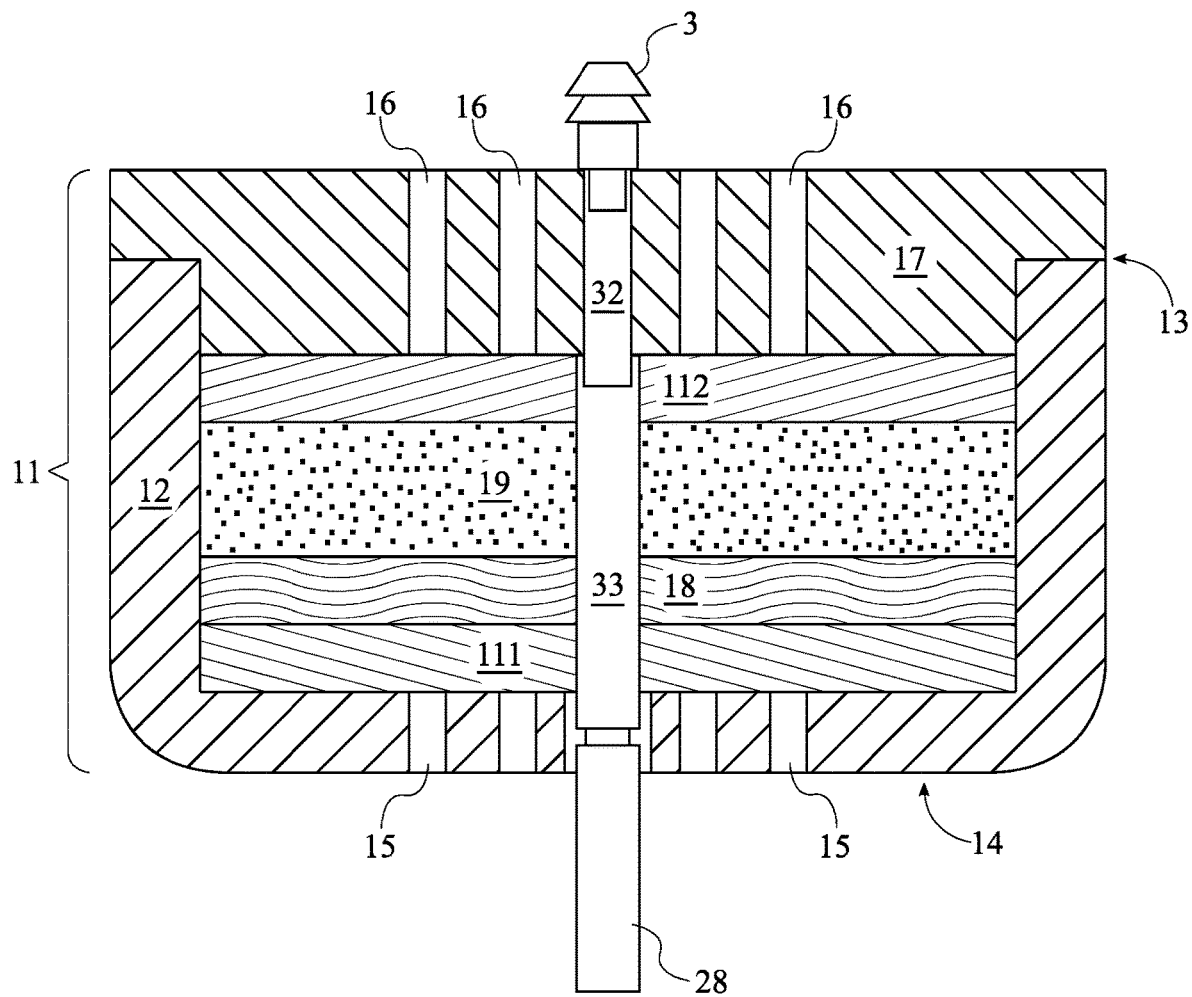
FIG. 3 is a schematic cross-sectional view of the degassing unit for the present invention. This view shows the input channel the gas-delivery tube.
Figure 4:
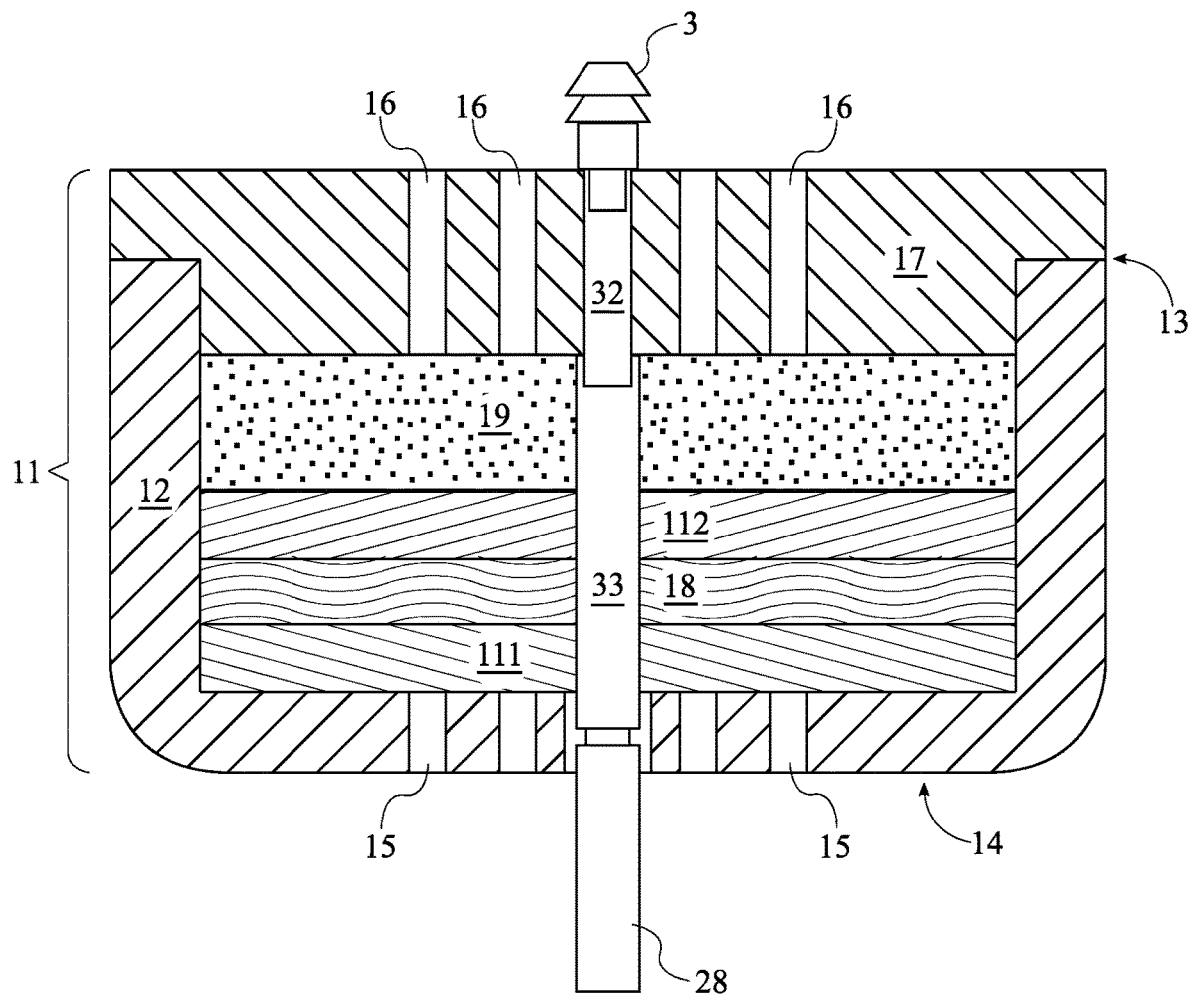
FIG. 4 is a schematic cross-sectional view of the degassing unit for an alternative embodiment of the present invention. This view shows the input channel the gas-delivery tube.

Preferably, a user is able to simply remove the cap 29 from the aeration chamber 1 and extract the ozonated water from the aeration chamber 1. Additionally, the degassing unit 11 is used to neutralize the excess ozone and to safely release benign gases into the present invention's surroundings. As can be seen in FIG. 2, FIG. 3, and FIG. 4, the degassing unit 11 comprises a tubular housing 12, an inlet fixture 15, a set of the outlet vents 16, a cover 17, at least one filter layer 18, and a quantity of degassing material 19. The tubular housing 12 is used as an enclosure for the other components of the degassing unit 11 and comprises an open housing end 13 and a closed housing end 14. The inlet fixture 15 allows the excess ozone to flow into the degassing unit 11 and is integrated into the closed housing end 14. The cover 17 is mounted onto the open housing end 13 but allows a user to selectively access the components enclosed by the tubular housing 12. In addition, the set of outlet vents 16 traverses through the cover 17 so that the neutralized excess gas is able to flow out of the degassing unit 11. The at least one filter layer 18 is used to remove any larger particulate from the excess ozone before the excess ozone reaches the quantity of degassing material 19, which is the actual means of neutralizing the harmful effects of the excess ozone. Additionally, the at least one filter layer 18 prevents particulate matter from falling out of the degassing unit 11 and into the aeration chamber 1. In order for the excess ozone to flow from the at least one filter layer 18 to the quantity of degassing material 19, the at least one filter layer 18 needs to be positioned within the tubular housing 12, adjacent to the closed housing end 14, and the quantity of degassing material 19 needs to be positioned with the tubular housing 12, adjacent to open housing end 13. Thus, this arrangement allows for the excess ozone to flow from the inlet fixture 15 to the set of outlet vents 16 but not before flowing through both the at least one filter layer 18 and the quantity of degassing material 19. Alternatively, the at least one filter layer 18 is used to prevent any of the degassing material 19 from falling into the water retained by the aeration chamber 1. The at least one filter layer 18 is preferably made of a fibrous material such as cotton. In addition, the quantity of degassing material 19 is preferably granules of Manganese. Alternatively, the quantity of degassing material 19 is may be composed of Manganese-Copper pellets. However, the quantity of degassing material 19 can alternatively be granules of activated Carbon or any other kind of material that neutralizes the harmful effects of ozone gas.

As can be seen in FIG. 2, FIG. 3, and FIG. 4, the degassing unit 11 may further comprise a first straining layer 111 and a second straining layer 112 in order to further separate the degassing material from the aeration chamber. In addition, the first straining layer 111 and the second straining layer 112 are used to secure the positioning of the at least one filter layer 18 and the quantity of degassing material 19 within the tubular housing 12. Consequently, the first straining layer 111 is positioned in between the closed housing end 14 and the at least one filter layer 18, and the second straining layer 112 is positioned in between the quantity of degassing material 19 and the cover 17. Alternatively, the second straining layer 112 is positioned in between the quantity of degassing material 19 and the at least one filter layer 18. The first straining layer 111 and the second straining layer 112 are preferably made of a metallic mesh.

Referring to FIG. 1, FIG. 2, and FIG. 3, the present invention is designed to enable the external ozone source to supply a stream of ozone gas to the aeration chamber 1 through the degassing unit 11. To accomplish this, the degassing unit 11 further comprises an input channel 32 and a gas-delivery tube 33. The input channel 32 traverses through the cover 17. Additionally, the ozone generator coupler 3 is terminally attached to the input channel 32. As a result, the external ozone source is able to be placed in fluid communication with the degassing unit 11. Additionally, the gas-delivery tube 33 is connected in between the input channel 32 and the input tube 28. Further, the gas-delivery tube 33 is mounted within the tubular housing 12. As such, the ozone generator coupler 3 is in fluid communication with the input tube 28 through the input channel 32 and the gas-delivery tube 33. Consequently, the stream of ozone gas enters the present invention through the ozone generator coupler 3. The stream of ozone gas then traverses through the input channel 32, the gas-delivery tube 33, and the input tube 28 before being distributed among the plurality of porous tubes 5 by the distribution hub 4. The stream of ozone gas then dissolves into the water within the aeration chamber 1 to form a homogeneous mixture. Excess ozone is vented trough the degassing unit 11 by passing through the inlet fixture 15, the degassing materials, and then out of the set of outlet vents 16.

Preferably, the present invention further comprises a handle 34 and a protective cover 35. The handle 34 is laterally connected to the aeration chamber 1. As a result, the user is able to grasp and reposition the present invention. The protective cover 35 is laterally attached to the aeration chamber 1 to prevent the aeration chamber 1 from becoming damaged by hazards in the external environment.

Preferably, the inlet fixture 15 for the degassing unit 11 is a plurality of inlet vents, and the closed housing end 14 of the tubular housing 12 acts as the cap 29 for the aeration chamber 1. Thus, the plurality of inlet vents allows the excess ozone to flow into the degassing unit 11 through what is either known as the cap 29 or as the closed housing end 14 for the second embodiment of the present invention.

Although the invention has been explained in relation to its preferred embodiment, it is to be understood that many other possible modifications and variations can be made without departing from the spirit and scope of the invention as hereinafter claimed.

SUPPLEMENTAL DESCRIPTION OF THE INVENTION

The present invention is a water container with an ozone diffuser that is used to produce ozonated water. Water either is pressurized through the present invention or is retained by the present invention. Ozone is then fed into the present invention from a pressurized source in order to aerate the ozone into the water. At the end, the present invention is able to dispense the ozonated water and exhaust the excess ozone into the present invention's surroundings. The present invention comprises an aeration chamber, an ozone generator coupler, a distribution hub, a plurality of porous tubes, and a degassing unit. The aeration chamber is used to retain the water that is to be aerated by the ozone. The ozone generator coupler is used to deliver the ozone from a pressurized source into the present invention. The distribution hub allows the present invention to evenly divide the ozone amongst the plurality of porous tubes. The plurality of porous tubes is used to aerate the ozone into the water retained by the aeration chamber. The degassing unit is used to separate the excess ozone from the ozonated water and safely neutralizes the excess ozone before exhausting the benign gases out of the present invention.

The general configuration of the aforementioned components allows the present invention to effectively and efficiently aerate ozone into water. The ozone generator coupler is positioned external to the aeration chamber so that the present invention is able to draw ozone from a pressurized source located outside of the present invention. The ozone generator coupler is in fluid communication with the distribution hub, which is mounted within the aeration chamber. In addition, the distribution hub is in fluid communication with the plurality of porous tubes. This configuration between the ozone generator coupler, the distribution hub, and the plurality of porous tubes allows the ozone to flow from the pressurized source into the present invention and allows the ozone to be aerated into the water retained by the aeration chamber. In addition, the plurality of porous tubes needs to be distributed within the aeration chamber so that the ozone that is forced out of the pores of the plurality of porous tubes are evenly spread throughout the water retained by the aeration chamber. Moreover, the degassing unit is in fluid communication with the aeration chamber and is positioned external to the degassing unit so that the excess ozone can be collected from the aeration chamber and be exhausted as benign gas out of the present invention.

The present invention can be configured into two different embodiments in order to receive ozone from a pressurized source. In the first embodiment the present invention further comprises a water feed coupler, a Venturi tee, a plurality of static mixers. The water feed coupler is used to receive water from an external source, wherein the water is typically driven into the water feed coupler by an external water pump. The Venturi tee allows ozone gas to be pressurized into the water coming from the water feed coupler. The Venturi tee comprises an unrestricted inlet portion, a constricted portion, and an unrestricted outlet portion, which allows for the unrestricted inlet portion to be in fluid communication with the unrestricted outlet portion through the constricted portion. Moreover, the water feed coupler is in fluid communication with the unrestricted inlet portion so that the water received from the water feed coupler is at a low velocity and at a high pressure. The ozone generator coupler is also in fluid communication with the constricted portion, which is used to increase the velocity of the water flowing through the Venturi tee. The increased velocity of the water reduces the pressure of the water and consequently allows the ozone generator coupler to more easily insert ozone into the water. Finally, the unrestricted outlet is in fluid communication with the plurality of static mixers so that the ozonated water is able to travel from the Venturi tee and into the plurality of static mixers. The plurality of static mixers is used to further homogenize the ozonated water, which is subsequently transferred into the aeration chamber because the plurality of static mixers is in fluid communication with the distribution hub. Resultantly, the first embodiment of present invention inserts ozone into the water retained by the aeration chamber by forcing already-ozonated water into the aeration chamber. The first embodiment of present invention is preferably integrated into a faucet, shower head, sprayer, or other water dispensing apparatus.

The second embodiment of the present invention is configured to receive ozone from a pressurized source in a different manner than the first embodiment. In the second embodiment, the present invention further comprises an input tube and a cap. Also in the second embodiment, the aeration chamber is a receptacle with an opening, and the cap is used to cover and uncover the opening of the receptacle. The opening is delineated by a rim of the receptacle so that the cap is removably engaged to the rim. The input tube is a conduit for ozone to travel into the water retained by the receptacle, and, thus, the input tube traverses through the cap and into the receptacle. Moreover, the ozone generator coupler is in fluid communication with the distribution hub through the input tube, which allows the input tube to be a pathway for a continuous supply of ozone from the ozone generator coupler to the distribution hub. Resultantly, the second embodiment of present invention inserts ozone into the water retained by forcing ozone gas into the refillable receptacle. The second embodiment of the present invention is preferably used as a portable ozonated water dispenser.

In both embodiments of the present invention, the plurality of porous tubes is configured to maximize the diffusion of ozone into the water retained by the refillable receptacle. Thus, the plurality of porous tubes needs to be distributed about the distribution hub and needs to be distributed throughout the aeration chamber. In addition, each of the plurality of porous tubes comprises a tube inlet and a tube outlet, which are the opposing open ends for each of the plurality of porous tubes. The tube inlet and the tube outlet from each of the plurality of porous tubes is in fluid communication with the distribution hub, which allows ozone to evenly enter through both ends of each porous tube and to be evenly forced out of the pores of each porous tube. The plurality of porous tubes is preferably made of polytetrafluoroethylene (PTFE).

For the second embodiment of the present invention, the plurality of porous tubes is fixed to the cap by a plurality of hangers. The plurality of porous tubes needs to comprise a first straight portion, an adjoining portion, and a second straight portion. The tube inlet leads into the first straight portion, while the tube outlet leads into the second straight portion. Moreover, the first straight portion and the second straight portion are in fluid communication with each other through the adjoining portion in order to form a U-shaped profile with each of the plurality of porous tubes. The U-shaped profile of each of the plurality of porous tubes positions the adjoining portion adjacent to the rim of the receptacle. Thus, the plurality of hangers is connected adjacent to the cap within the receptacle so that the adjoining portion for each porous tube can be hung from a corresponding hanger from the plurality of hangers. The arrangement between the cap, the plurality of hangers, the plurality of porous tubes, and the distribution hub for the second embodiment of the present invention allows for the distribution hub and the input tube to be removed from the receptacle when the cap is disengaged and removed from the receptacle.

The first embodiment of the present invention and the second embodiment of the present invention are differently configured to dispense the ozonated water from the aeration chamber. For the first embodiment, the present invention further comprises a water-release junction and an auto-relief gas valve. The water-release junction receives the ozonated water from the aeration chamber and diverts the ozonated water between a kind of water dispensing unit (such as a faucet or a shower head) and the degassing unit. Thus, the water-release junction comprises a junction inlet, a first junction outlet, and a second junction outlet. The junction inlet is in fluid communication with the aeration chamber, which allows the ozonated water to flow into the water-release junction. The first junction outlet is in fluid communication with the aforementioned water dispensing unit so that a user is able to access the ozonated water from the present invention. The second junction outlet is in fluid communication with the degassing unit through the auto-relief gas valve so that the auto-relief gas valve is able to release the buildup of excess ozone from the water-release junction into the degassing unit. In order to improve the fluid dynamics of the water-release junction, the water-release junction is preferably configured into a T-shaped junction so that the junction inlet and the second junction outlet are collinear to each other and so that the first junction outlet is positioned perpendicular to the second junction outlet. For the second embodiment of the present invention, a user is able to simply remove the cap from the aeration chamber and extract the ozonated water from the aeration chamber.

In both embodiments of the present invention, the degassing unit is used to neutralize the excess ozone and to safely release the excess ozone into the present invention's surroundings. The degassing unit comprises a tubular housing, an inlet fixture, a set of the outlet vents, a cover, at least one filter layer, and a quantity of degassing material. The tubular housing is used as an enclosure for the other components of the degassing unit and comprises an open housing end and a closed housing end. The inlet fixture allows the excess ozone to flow into the degassing unit and is integrated into the closed housing end. The cover is mounted onto the open housing end but allows a user to selectively access the components enclosed by the tubular housing. In addition, the set of outlet vents traverses through the cover so that the neutralized excess ozone is able to flow out of the degassing unit. The at least one filter layer is used to remove any larger particulate from the excess ozone before the excess ozone reaches the quantity of degassing material, which is the actual means of neutralizing the harmful effects of the excess ozone. In order for the excess ozone to flow from the at least one filter layer to the quantity of degassing material, the at least one filter layer needs to be positioned within the tubular housing, adjacent to the closed housing end, and the quantity of degassing material needs to be positioned with the tubular housing, adjacent to open housing end. Thus, this arrangement allows for the excess ozone to flow from the inlet fixture to the set of outlet vents but not before flowing through both the at least one filter layer and the quantity of degassing material. Alternatively, the at least one filter layer is used to prevent any of the degassing material from falling into the water retained by the aeration chamber. The at least one filter layer is preferably made of a fibrous material such as cotton. In addition, the quantity of degassing material is preferably granules of Manganese. However, the quantity of degassing material can alternatively be granules of activated Carbon or any other kind of material that neutralizes the harmful effects of ozone gas.

The degassing unit may further comprise a first straining layer and a second straining layer in order to further neutralize any harmful entities within the excess ozone. In addition, the first straining layer and the second straining layer are used to secure the positioning of the at least one filter layer and the quantity of degassing material within the tubular housing. Consequently, the first straining layer is positioned in between the closed housing end and the at least one filter layer, and the second straining layer is positioned in between the quantity of degassing material and the cover. The first straining layer and the second straining layer are preferably made of a metallic mesh.

The degassing unit has variations in its configuration between the first embodiment of the present invention and the second embodiment of the present invention. For the first embodiment, the inlet fixture for the degassing unit is an inlet port so that the auto-relief gas valve is specifically in fluid communication with the inlet port, which is a single opening in the tubular housing of the degassing unit. For the second embodiment, the inlet fixture for the degassing unit is a plurality of inlet vents, and the closed housing end of the tubular housing acts as the cap for the aeration chamber. Thus, the plurality of inlet vents allows the excess ozone to flow into the degassing unit through what is either known as the cap or as the closed housing end for the second embodiment of the present invention.

In another configuration of the first embodiment, the present invention further comprises a water-release spout and the auto-relief gas valve in order to efficiently separate the excess ozone gas from the ozonated water. For this configuration, the degassing unit is in direct fluid communication with the aeration chamber through the auto-relief gas valve, which is located on the top of the aeration chamber because the excess ozone gas would settle near the top of the aeration chamber. In addition, the water-release spout is used to dispense the ozonated water from the aeration chamber and thus is in fluid communication with the aeration chamber. The water-release spout is preferably located on the lateral portion of the aeration chamber, offset from the auto-relief gas valve, so that the water-release spout is near the ozonated water retained by the aeration chamber. This other configuration of the first embodiment preferably couples the water-release spout to a booster pump in order to dispense the ozonated water out of the present invention with more force. Thus, this other configuration could be used as a carpet shampooer or a garden backpack sprayer.

What is claimed is:

1. A water container with an ozone diffuser comprises:
an aeration chamber;
an ozone generator coupler;
a distribution hub;
a plurality of porous tubes;
a degassing unit;
the distribution hub being mounted within the aeration chamber;
the plurality of porous tubes being distributed within the aeration chamber;
the ozone generator coupler and the degassing unit being positioned external to the aeration chamber;
the ozone generator coupler being in fluid communication with the distribution hub;
the distribution hub being in fluid communication with the plurality of porous tubes; and
the aeration chamber being in fluid communication with the degassing unit.

2. The water container with an ozone diffuser as claimed in claim 1 comprises:
a water feed coupler;
a Venturi tee;
a plurality of static mixers;
the Venturi tee comprises an unrestricted inlet portion, a constricted portion and an unrestricted outlet portion;
the water feed coupler being in fluid communication with the unrestricted inlet portion;
the ozone generator coupler being in fluid communication with the constricted portion;
the unrestricted outlet portion being in fluid communication with the plurality of static mixers; and
the plurality of static mixers being in fluid communication with the distribution hub.

3. The water container with an ozone diffuser as claimed in claim 1 comprises:
an input tube;
a cap
the aeration chamber being a receptacle;
the cap being removably engaged to a rim of the receptacle;
the input tube traversing through the cap and into the receptacle; and
the ozone generator coupler being in fluid communication with the distribution hub through the input tube.

4. The water container with an ozone diffuser as claimed in claim 1 comprises:
each of the plurality of porous tubes comprises a tube inlet and a tube outlet;
the plurality of porous tubes being distributed about the distribution hub;
the plurality of porous tubes being distributed throughout the aeration chamber; and
the tube inlet and the tube outlet for each of the plurality of porous tubes being in fluid communication with the distribution hub.

5. The water container with an ozone diffuser as claimed in claim 4 comprises:
a plurality of hangers;
a cap;
the aeration chamber being a receptacle;
each of the plurality of porous tubes comprises a first straight portion, an adjoining portion, and a second straight portion;
the cap being removably engaged to a rim of the receptacle;
the first straight portion and the second straight portion being in fluid communication to each other through the adjoining portion;
the adjoining portion being positioned adjacent to the rim of the receptacle;
the plurality of hangers being connected adjacent to the cap within the receptacle; and
the adjoining portion for each of the plurality of porous tubes being hung from a corresponding hanger from the plurality of hangers.

6. The water container with an ozone diffuser as claimed in claim 1 comprises:
a water-release junction;
an auto-relief gas valve;
the water-release junction comprises a junction inlet, a first junction outlet, and a second junction outlet;
the junction inlet being in fluid communication with the refillable receptacle; and
the second junction outlet being in fluid communication with the degassing unit through the auto-relief gas valve.

7. The water container with an ozone diffuser as claimed in claim 6 comprises:
the junction inlet and the second junction outlet being collinearly positioned to each other; and
the first junction outlet being positioned perpendicular to the second junction outlet.

8. The water container with an ozone diffuser as claimed as claim 1 comprises:
the degassing unit comprises a tubular housing, an inlet fixture, a set of outlet vents, a cover, at least one filter layer, and a quantity of degassing material;
the tubular housing comprises an open housing end and a closed housing end;
the at least one filter layer being positioned within the tubular housing, adjacent to the closed housing end;
the quantity of degassing material being positioned within the tubular housing, adjacent to the open housing end;
the cover being mounted onto the open housing end;
the inlet fixture being integrated into the closed housing end; and
the set of outlet vents traversing through the cover.

9. The water container with an ozone diffuser as claimed as claim 8, wherein the at least one filter layer is made of a fibrous material.

10. The water container with an ozone diffuser as claimed as claim 8, wherein the quantity of degassing material is granules of Manganese.

11. The water container with an ozone diffuser as claimed in claim 8 comprises:

a water-release junction;
an auto-relief gas valve;
the inlet fixture being an inlet port;
the aeration chamber being in fluid communication with the auto-relief gas valve through the water-release junction; and
the auto-relief gas valve being in fluid communication with the inlet port.

12. The water container with an ozone diffuser as claimed as claim 8 comprises:
the aeration chamber being a receptacle;
the inlet fixture being a plurality of inlet vents; and
the closed housing end being removably engaged to a rim of the receptacle.

13. The water container with an ozone diffuser as claimed as claim 8 comprises:
the degassing unit further comprises a first straining layer and a second straining layer;
the first straining layer being positioned in between the closed housing end and the at least one filter layer; and
the second straining layer being positioned in between the quantity of degassing material and the cover.

14. The water container with an ozone diffuser as claimed in claim 1 comprises:
a water-release spout;
an auto-relief gas valve;
the degassing unit being in fluid communication with the aeration chamber through the auto-relief gas valve; and
the water-release spout being in fluid communication with the aeration chamber.

* * * * *